United States Patent [19]

Nakatogawa

[11] 4,116,575

[45] Sep. 26, 1978

[54] ENCAPSULATED REINFORCEMENT IN MOULDED SHAFT

[75] Inventor: Yoshio Nakatogawa, Miyagi, Japan

[73] Assignee: Alps Electric Co., Ltd., Tokyo, Japan

[21] Appl. No.: 817,179

[22] Filed: Jul. 20, 1977

[30] Foreign Application Priority Data

Jul. 20, 1976 [JP] Japan .............................. 51-96311[U]

[51] Int. Cl.[2] .......................... B25G 3/34; F16B 17/00

[52] U.S. Cl. ...................................... 403/265; 264/275

[58] Field of Search ............... 403/265, 266, 267, 290, 403/289, 361, 354, 364, 344, 241; 264/275; 24/257 R, 262

[56] References Cited

U.S. PATENT DOCUMENTS

| | | | |
|---|---|---|---|
| 2,111,107 | 3/1938 | Walde | 403/266 X |
| 2,156,067 | 4/1939 | Rubinstein | 403/354 X |
| 2,259,725 | 10/1941 | Bohnenblust | 403/361 X |
| 2,692,205 | 10/1954 | Greider et al. | 403/265 X |
| 3,193,312 | 7/1965 | Ehner | 403/354 |
| 3,243,165 | 3/1966 | DeWoody et al. | 403/354 X |
| 3,463,870 | 8/1969 | Eucker | 24/262 X |
| 3,719,378 | 3/1973 | Windsor | 403/354 X |
| 3,899,564 | 8/1975 | Kessler | 264/275 X |
| 3,991,146 | 11/1976 | Barrie | 264/275 X |

*Primary Examiner*—Wayne L. Shedd
*Attorney, Agent, or Firm*—Guy W. Shoup; Gerard F. Dunne

[57] ABSTRACT

A coupling shaft provided with a resilient member molded integrally therewithin during the molding process of the shaft and which is used to prevent a knob from loosening during service.

1 Claim, 2 Drawing Figures

ENCAPSULATED REINFORCEMENT IN MOULDED SHAFT

BACKGROUND OF THE INVENTION

1. Field of the Invention

This invention relates to a coupling shaft such as that used for variable resistors or switches, and particularly to the structures of molded coupling shafts.

2. Description of the Prior Art

As illustrated in FIG. 1, a conventional coupling shaft for electrical parts generally consists of a leading rod 1 formed integrally with a coupling head 1' having a knurling 2 on the periphery thereof and a slot 3 formed along the axis thereof, and a leaf spring 4 of U-type or other appropriate shape which is set under pressure in the slot 3 to urge the slot open by means of the resilient force of the spring, thereby preventing a knob (not shown) from falling off.

However, in the conventional coupling shaft as described above, the setting of the leaf spring 4 in the slot 3 often takes much time and the leaf spring 4 sometimes comes out of the slot 3 due to shocks or the like applied to the shaft 10 from the outside.

SUMMARY OF THE INVENTION

Accordingly, it is an object of the present invention to provide an improved coupling shaft without having the above-mentioned shortcomings. The improved coupling shaft according to this invention can be made of metal or insulating material such as synthetic resin, for example; the former is obtained by zinc die casting and the latter by ordinary molding. A resilient member is embedded in the shaft in such a manner that a slot in the shaft is positioned in a valley formed by two arms of the resilient member.

BRIEF DESCRIPTION OF THE DRAWINGS

The above mentioned and other objects as well as the advantageous features of this invention will become apparent from the following description of a preferable embodiment of this invention taken in conjunction with the annexed FIG. 2, which shows a partly-sectioned side view of a coupling shaft according to the present invention.

DESCRIPTION OF THE PREFERRED EMBODIMENTS

Figure 1:
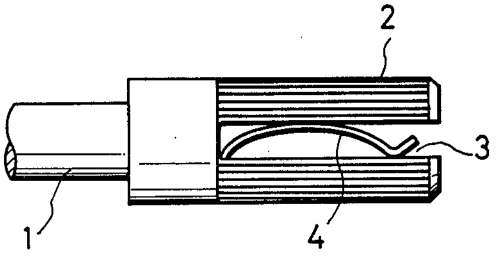
FIG. 1 shows a conventional coupling.
Figure 2:
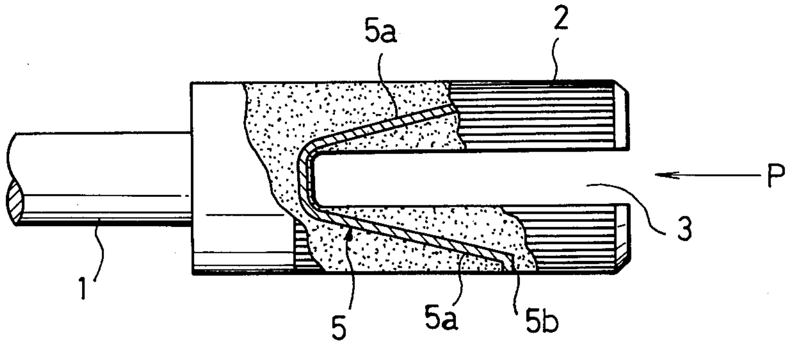

Referring now to FIG. 2, the coupling shaft according to the present invention is generally indicated by the reference numeral 10. The reference numeral 1 shows a leading rod, 1' shows a coupling head formed integrally with the rod, 2 shows a knurling provided on the periphery of the coupling head 1', B shows a slot formed along the axis of the coupling head 1', and 5 shows a resilient member or leaf spring embedded in the coupling head during the process of its molding or die casting. The resilient member 5 may be made from a metallic plate and is provided with two arms 5*a* and 5*a'* each embedded in the head 1' in such a manner that the slot 3 is positioned in the valley formed between two arms 5*a* and 5*a'*. Thus, a knob (not shown) to be forced onto the knurling portion 2 of the coupling head 1' is securely mounted thereon and prevented from coming out of place due to shock and the like.

A method of embedding the resilient member 5 into the coupling head 1' will be hereinafter explained in detail. In the case of zinc die casting, the resilinet member 5 is provided with the desired shape in advance and pushed in the direction of arrow P into dies filled with a melted zinc, simultaneously with the formation of the slot 3 by means of an appropriate pin. The arms 5*a* and 5*a'* of the resilient member 5 gradually expand outward within the melted zinc which now starts to solidify until both tips 5*b*, 5*b* abut the inside of the dies at the periphery of the coupling head 1'. When the zinc is completely solidified, the resilient member 5 is held within the coupling shaft 10 while retaining a resilient force that tends to expand outward. This resilient force continually acts to expand the slot 3 outward and completely prevents the knob from coming out of the knurling portion 2. This production method can also be applied to a shaft molded from a material such as plastic and just the same results can be obtained.

As mentioned above, because the coupling shaft 10 of this invention is made by molding material and is so constructed that the slot 3 is provided in the coupling head 1' while the resilient member 5 is embedded within the shaft 10, the time consuming works of setting the leaf spring 4 generally used in the conventional shaft is not needed, and anxieties that the resilient member 5 may become detached due to shock are completely eliminated. In addition, if the resilient member 5 is made of a metallic plate, it greatly enhances the strength of the coupling shaft 10 itself and also attains, without fail, excellent performance for holding the knob in its position.

Accordingly, it is intended that the foregoing disclosure and the showings made in the drawing shall be considered only as illustrations of the principles of this invention and are not to be construed in a limiting sense.

What is claimed is:

1. A coupling shaft used for electrical parts, made of molded material and provided with a slot along the axis of a coupling head characterized in that a resilient member is embedded in the shaft in such a manner that said slot is positioned in a valley formed by two arms of said resilient member.

* * * * *